Aug. 4, 1964  H. R. WEISS  3,143,237
FRUIT TRAY
Filed Nov. 22, 1961  2 Sheets-Sheet 1

INVENTOR
Hugh R. Weiss
BY McCoy, Greene + Te Grotenhuis
ATTORNEYS

Aug. 4, 1964

H. R. WEISS 3,143,237

FRUIT TRAY

Filed Nov. 22, 1961

INVENTOR
Hugh R. Weiss
BY McCoy, Greene & te Grotenhuis
ATTORNEYS

United States Patent Office 3,143,237
Patented Aug. 4, 1964

3,143,237
FRUIT TRAY
Hugh R. Weiss, Montclair, N.J., assignor to The Pantasote Company, Passaic, N.J., a corporation of New Jersey
Filed Nov. 22, 1961, Ser. No. 154,140
6 Claims. (Cl. 217—26.5)

The present invention relates to multiple compartment trays formed from thin sheets of a thermoplastic resinous material and more particularly to improved one-piece plastic trays constructed to receive a large amount of fruit.

This application contains subject matter divided out of my copending application Serial No. 140,375, filed September 25, 1961.

The tray of this invention is constructed to provide improved means for handling perishable articles, such as peaches, plums, nectarines, persimmons, figs, apples, or the like, whose size and shape vary considerably. The tray is formed from a sheet of polyvinyl chloride or other suitable resinous material by a molding operation to provide a multiplicity of deep closely spaced cups or pockets, each having a series of hollow upwardly projecting posts and a series of double-wall narrow partitions extending between adjacent posts. The tapered walls of the cups are thus formed by the walls of the posts and partitions. The cups are preferably arranged in parallel rows, and the partitions preferably increase in height from their centers toward the adjacent posts.

The tray of this invention is preferably constructed to hold a large amount of fruit in a given perimeter while at the same time protecting the fruit against damage. The tray is shaped to provide deep tapered cups or pockets, each of which engage a piece of fruit at a multiplicity of points around the entire circumference thereof. The cups are preferably pleated or corrugated to facilitate expansion of the cups and engagement of the cups with the peripheral portions of the fruit. The individual cups may be rounded or generally circular in cross section, and it is usually preferred to have six posts spaced around each cup; but the cups may have an oblong horizontal cross section, and the posts may be irregularly spaced.

In one form of the present invention, the cups of the tray are regularly spaced in parallel longitudinal rows and in parallel diagonal rows. The distance between the centers of adjacent cups in the diagonal rows is greater than the distance between the centers of the adjacent cups in the longitudinal rows, whereby the cups are oblong in horizontal cross section. Two of the partitions of each cup are preferably constructed with substantially less height than the other partitions to facilitate turning of each oblong piece of fruit to the most desirable position in the cup.

In another form of the invention, the diagonal rows are inclined at an angle of 60 degrees relative to the longitudinal (or lateral) rows, and the distance between the centers of adjacent cups in a longitudinal row is substantially the same as the distance between the centers of the cups in each diagonal row. In such a tray all of the partitions may be of substantially the same height. The upper portions of the partitions are preferably provided with thin flat fins of crescent shape to separate adjacent cups.

An object of the invention is to provide a simple, attractive, inexpensive, durable, plastic tray which holds its shape effectively, while at the same time accommodating perishable articles of varying shapes and sizes and protecting them against damage.

A further object of the invention is to provide a tray which holds a large amount of fruit in a given perimeter.

A still further object of the invention is to provide a tray which can be filled in a minimum period of time without damaging the fruit.

Another object of the invention is to protect fruit in the marginal cups of a fruit tray.

A further object of the invention is to provide marginal cups which expand substantially to accommodate fruit of different sizes.

Another object of the invention is to provide improved air circulation in boxes containing plastic fruit trays or the like.

Other objects, uses and advantages of the invention will become apparent to those skilled in the art from the following description and claims and from the drawings in which:

Figure 9:
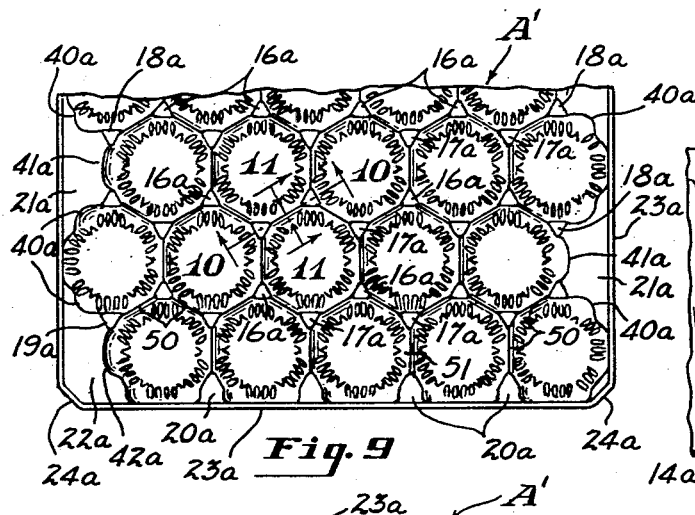
FIGURE 9 is a fragmentary top plan view on a reduced scale showing the end portion of another form of plastic tray constructed according to this invention.
Figure 11:
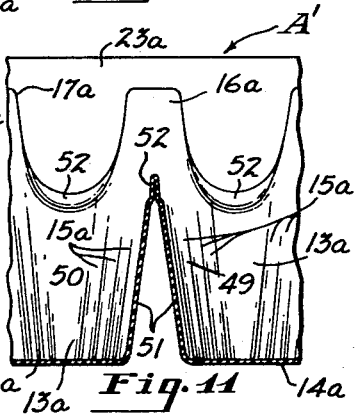
Figure 10:
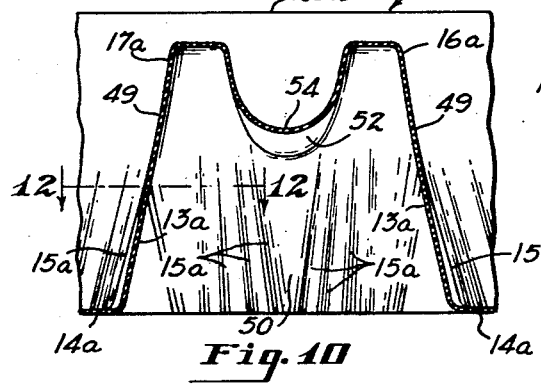
FIGURE 10 is a fragmentary transverse vertical sectional view taken on the line 10—10 of FIGURE 9 and on a larger scale.
Figure 12:
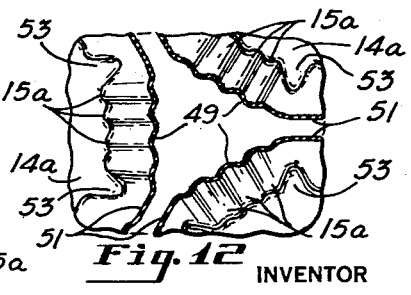

FIGURE 11 is a fragmentary vertical sectional view taken on the line 11—11 of FIGURE 9; and FIGURE 12 is a fragmentary horizontal sectional view taken substantially on the line 12—12 of FIGURE 10 and on the same scale as FIGURES 10 and 11.

Figure 1:
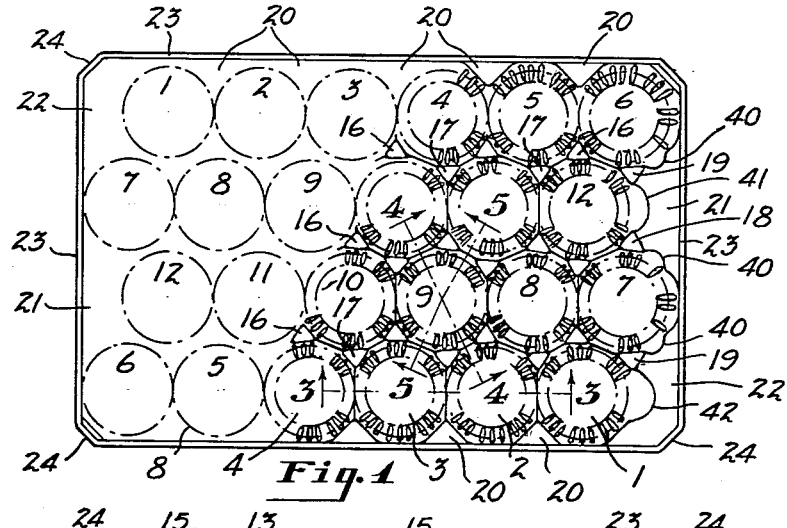
FIGURE 1 is a top plan view on a reduced scale showing a plastic tray constructed according to this invention, a substantial portion thereof being shown schematically.
Figure 2:
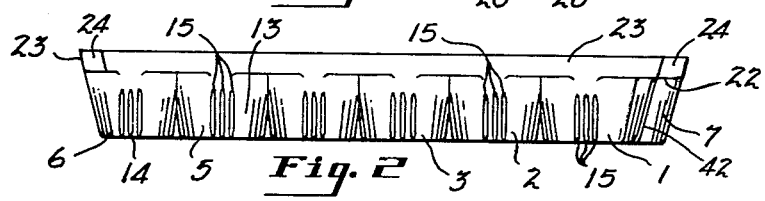
FIGURE 2 is a side elevational view of the tray of FIGURE 1 on the same scale.

Referring more particularly to the drawings, in which like parts are identified by the same numerals throughout the several views, FIGURES 1 and 2 show a 24-count plastic tray A constructed according to the present invention and suitable for the packaging of fruit whose size varies somewhat. The tray may be formed by the vacuum molding of flat sheets of uniform thickness, as disclosed, for example, in United States Patent No. 2,902,-718. The tray may be formed of polyvinyl chloride or similar vinyl resins or various other thermoplastic materials as is well understood in the art.

The trays may, for example, be formed from a flat sheet of polyvinyl chloride or similar vinyl resin having a uniform thickness of 0.0015 to 0.020 inch. Such material may be free of plasticizer or may contain small amounts of plasticizers, stabilibers, fillers and pigments. Excellent results may be obtained when employing a homopolymer of vinyl chloride which is free of plasticizer and is formed into a sheet having a uniform thickness of 0.002 to 0.010 inch. The pleating of the cups provides substantial flexibility even when the flat resin sheet is substantially inextensible prior to molding.

The tray shown herein is molded from a single sheet of thin thermoplastic material to provide four longitudinal rows of deep cup-shaped portions, each row containing six cups or pockets in longitudinal alignment. The first or outer row contains cups 1 to 6, and the second or intermediate row contains cups 7 to 12, which are adjacent to and diagonally disposed relative to the cups of the first row. The cup portions 8, 9, 10 and 11 of the second row are identified herein as "inner cups" and the remaining cups are identified herein as "outer cups." The cups 1, 7, 12 and 6 at the ends of the longitudinal rows are identified herein as "end cups."

It will be noted that all of the cups are arranged to provide parallel diagonal rows or transverse rows as well as the parallel longitudinal rows. Thus, one diagonal row contains the cups 2, 8, 12 and 6 while an adjacent row extending in a different direction contains the cups 3, 10, 9 and 2, the cups being regularly spaced and in alignment in each row. Each cup of the plastic tray is thus in alignment with a series of other cups in one of the transverse rows and also in alignment with 5 other cups in the four longitudinal rows. Each inner cup is surrounded by six other cups and six upwardly projecting tapered hollow posts identified by the numerals 16 and 17. Each cup has a tapered peripheral wall 13 of rounded (polygonal) horizontal cross-section and a flat bottom wall 14, but it will be apparent that some advantages of this invention may be obtained where each inner cup has only four posts and has a substantially different shape. A tray of the type described may contain 56 or more cups.

Figure 3:
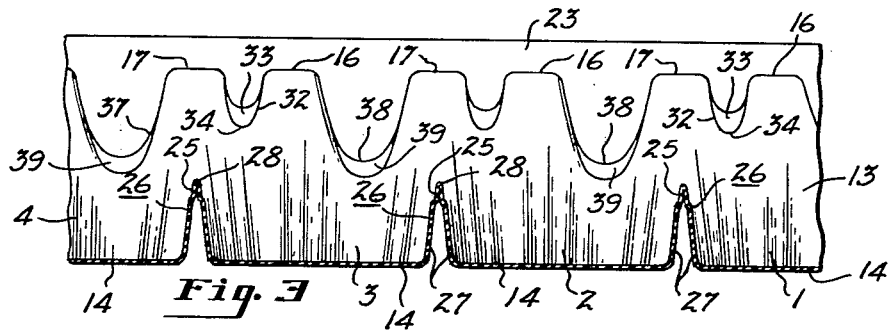
FIGURE 3 is a fragmentary longitudinal vertical sectional view taken on the line 3—3 of FIGURE 1 and on a larger scale.
Figures 4, 5:
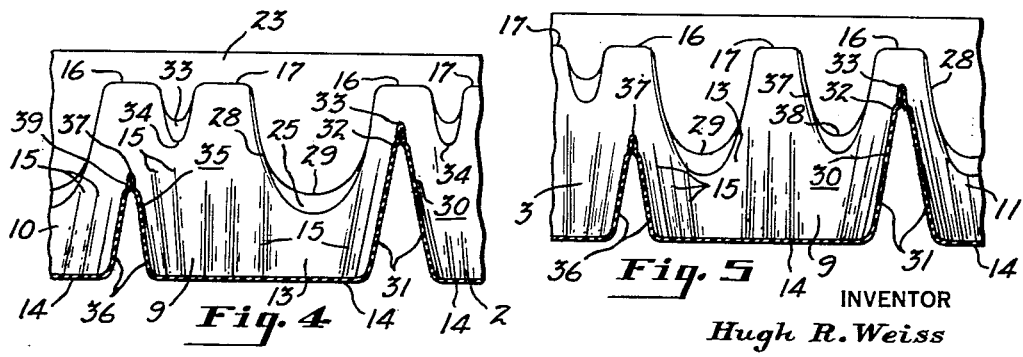
FIGURE 4 is a fragmentary transverse vertical sectional view taken on the line 4—4 of FIGURE 1.
FIGURE 5 is a fragmentary transverse vertical sectional view taken on the line 5—5 of FIGURE 1 and on the same scale as FIGURES 3 and 4.

The posts 16 and 17 have flat upper surfaces located in a plane parallel to the plane containing the bottom walls 14 of the cups and to the plane containing the upper edge of the marginal flange 23. The marginal portion of the tray is formed with a vertical marginal flange 23 of uniform width which projects upwardly a fraction of an inch above the plane containing the upper surfaces of the posts 16 and 17 as shown in FIGURES 3, 4 and 5.

Relatively wide ledges 21 and 22 are provided at the ends of the longitudinal rows to fill the space between the end cup (1 or 12) and the marginal flange 23. Such ledges are preferably no higher than the posts 16 and 17 and may be flat and located in a plane parallel to the bottom walls 14 like the similar ledges disclosed in copending application Serial No. 140,375, filed September 25, 1961.

The portions of the tray adjacent the ledges 21 and 22 are preferably shaped to provide short posts or projections 18 and 19 having flat upper surfaces similar to those of posts 16 and 17 and located in a plane parallel to the plane containing the tops of the posts 16 and 17 and preferably a small fraction of an inch below the latter plane. It will be understood, however, that the upwardly projecting top portions of the posts 18 and 19 are not essential.

The marginal flange 23 preferably has a generally rectangular shape with straight portions at the sides and ends of the tray. The flange preferably has beveled corner portions 24 as shown in FIGURE 1 to facilitate circulation of air along the corners of the boxes in which the trays are placed. At the sides of the tray generally triangular side ledges 20 may be provided between the adjacent cups. Such ledges may have flat upper surfaces located in the same plane as the upper surfaces of the ledges 21 and 22, but this is not essential. The portions of the tray at 20 define tapered half-posts somewhat similar to the tapered posts 18 and 19.

In order to facilitate expansion, each cup of the tray is provided with vertical corrugations or pleats 15. Such pleats may be of the type disclosed in the aforesaid application Serial No. 140,375. As herein shown, such pleats are provided on the posts and adjacent the margin of the tray but are omitted at the partitions.

Partitions are provided between adjacent posts to connect the adjacent cups. Each inner cup has six partitions and six hollow posts, but it will be understood that this number is not essential. As herein shown, each inner cup has two relatively short partitions 26, two relatively high partitions 30, and two partitions 35 having a height materially greater than that of the partitions 26 and materially less than that of the partitions 30. Each partition 26 has a pair of diverging walls 27 integrally joined at the upper surface 28 which is rounded as shown in FIGURES 4 and 5. The central part 29 of the surface 28 preferably has a height materially less than half of the height of the posts 16 and 17, and such height may be less than ⅓ the height of the tray at the margin. As herein shown, the upper portions of the partition walls are flat and in contact so as to define a narrow flat fin 25, the walls diverging suddenly at the bottom of said fin.

Each partition 30 has a pair of diverging walls 31 which are integrally joined at the rounded upper surface 32 and have a flat double-wall fin 33 similar to the fin 25. The central part 34 of the curved upper surface 32 has a height materially greater than half the height of the posts 16 and 17 and preferably materially greater than half the height of the tray at the marginal flange 23.

Each partition 35 has a pair of diverging walls 36 integrally joined at the rounded upper surface 37 of the flat double-wall fin 39. The central part 38 of the surface 37 has a height materially greater than that of the part 29 and materially less than that of the part 34. The height of the part 38 is usually at least about half the height of the posts 16 and 17 and may be greater than half the height of the tray at the margin thereof.

Figure 6:
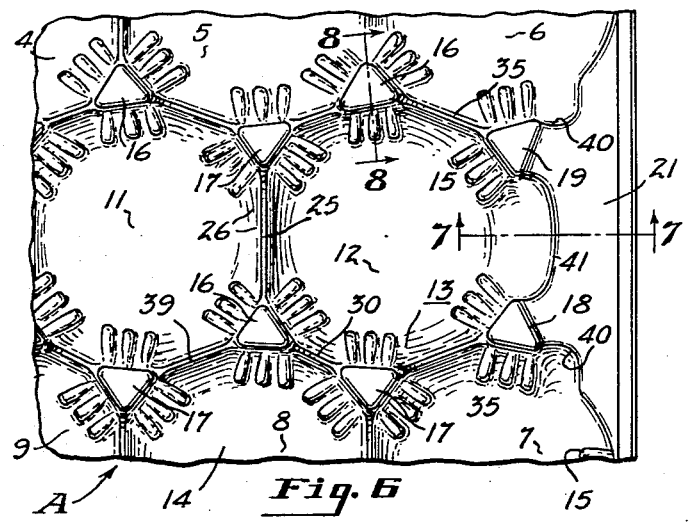
FIGURE 6 is a fragmentary top plan view of the tray of FIGURES 1 to 5 on a reduced scale.

The distance between the posts 16 and 17 at opposite ends of each partition 30 is at least one-third less than the distance between the posts 16 and 17 at the ends of each partition 26 as is apparent from FIGURE 6.

If desired, the peripheral walls of the end cups 1, 6, 7 and 12 may be provided with radially outwardly projecting portions forming channels of substantial width to facilitate expansion of the cups adjacent the end of the tray, as disclosed in more detail in said copending application Serial No. 140,375. As herein shown, the tray is provided with vertical channels 40 of rounded cross section on opposite sides of the ledge 21 and on opposite sides of the end cup 7. These channels extend downwardly from the ledges 21 and 22 to the bottom wall 14. Relatively wide channels 41 and 42 are provided at the centers of the ledges 21 and 22 which also extend to the bottom walls 14.

Figure 7:
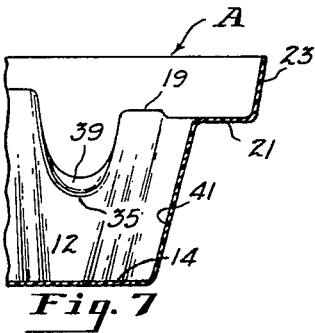
FIGURE 7 is a fragmentary longitudinal, vertical, sectional view taken on the line 7—7 of FIGURE 6 and on the same scale.
Figure 8:
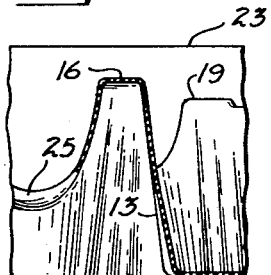
FIGURE 8 is a fragmentary vertical sectional view taken on the line 8—8 of FIGURE 6.

The channels 40 and 41 have a rounded cross section and are constructed like the channels 126 and 226 described in the aforesaid application Serial No. 140,375. FIGURES 6 and 7 are drawn to scale to facilitate an understanding of the invention. Each channel 40, 41 and 42 is relatively wide as compared to the pleats 15 of the tray and may, for example, have a length only 2 to 5 times its width, but it will be understood that such width may vary considerably. Each channel 41 and 42 preferably extends circumferentially a distance greater than the width of the posts 16 and 17 and usually no less than 30 degrees along the circumference of the cup.

In the drawings a portion of the tray is shown in detail, it being understood that the remainder of the tray is constructed in a similar manner.

It will be noted that the upper portions of the partitions 26 are in longitudinal alignment in each longitudinal row, that the central portions of the partitions 30 are in longitudinal alignment between adjacent longitudinal rows of cups as is the case with the partitions 35, that the central portions of the partitions 30 are located not only in regularly spaced longitudinal rows but also in regularly spaced lateral rows, and that the same is true for the partitions 35.

If desired, the tray may be constructed exactly as shown in the drawings which are drawn substantially to scale. The size of the cups will depend on the type of article to be placed therein. The tray shown herein is especially adapted to handle fruit. The cups usually have a depth not substantially greater than their maximum width, and the partitions 26, 30 and 35 usually are relatively narrow. Such partitions may, for example, have an average width (measured in a direction away from the center of its associated cup) which is 1/25 to 1/10 the average height of the partition. The size of the partition will, of course, vary depending on the thickness of the sheet material and the size of each cup. The pleats or corrugations in the cup are usually tapered and relatively narrow and may, for example, have a length ten to twenty times their average width. It will be understood, however, that the type of pleats employed may vary considerably.

The cups of the tray of this invention are preferably rather deep so as to protect the fruit and the marginal flange 23 preferably projects a substantial distance above the plane containing the top surfaces of the posts 16 and 17 to protect the fruit in the marginal cups of the tray. In the trays shown herein, each cup preferably has a depth which is 0.8 to 1.2 times its average diameter, and the marginal flange 23 preferably projects 0.1 to 0.3 inch above the posts 16 and 17. Since the ledges 21 and 22 are located below the tops of the posts 16 and 17, the flange 23 may have a width of 0.3 to 0.6 inch. The above dimensions apply to ordinary size trays having a width of 10 to 20 inches, a length of 12 to 24 inches and a depth of 2 to 5 inches, but it will be understood that the dimensions may vary considerably. The present invention is particularly concerned with fruit trays having 20 to 80 cups, however.

The upper surfaces 28, 32 and 37 of the partition fins 25, 33 and 39 preferably have a rounded or generally arcuate shape, but this is not essential. As herein shown, said upper surfaces have a generally parabolic shape. The fins may be omitted on some or on all partitions since they do not substantially effect the functioning of the partitions, but such fins are preferred to separate adjacent pieces of fruit.

Advantages of this invention may obviously be obtained even when the heights of the partitions vary considerably. The height of the central point 29 of each partition 26 is preferably at least one-fifth the height of the tray at the margin of the tray and is usually substantially greater than one-fifth the height of the posts 16 and 17 or sufficient to separate the adjacent cups.

The height of the point 34 of the highest partitions is preferably materially less than the height of the posts 16 and 17 and is usually no more than 4/5 the height of said posts, but the distance between the posts 16 and 17 at the ends of each partition 30 may be very small. In fact the two posts may be united as a single post of narrow horizontal cross section.

It will be noted that the cups of the tray A are oblong and the distance between the posts at the ends of each partition 26 shown herein is materially greater than the distance between the posts at the ends of each partition 30 or 35. Such irregular arrangement is provided so as to obtain a maximum weight of fruit in a tray of a given perimeter. In order to "make the weight," it is important that the size of the ledges, such as the ledges 20, 21 and 22, be minimized and that some of the rows be shortened as in the tray A. However, the present invention permits loading of a large weight of fruit into a given perimeter even when the posts of each cup are regularly spaced. This is illustrated by the modified form of tray A' shown in FIGURES 9 to 12.

The tray A' is a 35-count fruit tray which may be formed from a single sheet of thermoplastic material like the tray A described above. The tray has 35 closely spaced cup-shaped portions of generally circular (polygonal) horizontal cross section arranged in seven parallel lateral rows and in parallel diagonal rows inclined at an angle of 60 degrees relative to said lateral rows. The centers of the cups in each lateral row are regularly spaced apart the same distance as the centers of the cups in each diagonal row. Each cup has a tapered peripheral wall 13a, a flat bottom wall 14a, vertical pleats 15a, and six upwardly projecting hollow posts 16a and 17a (the parts of the tray A' corresponding to parts of the tray A are identified by the same numeral with the suffix added). The posts 16a and 17a have upper surfaces located substantially in a common horizontal plane parallel to the bottom walls of the cups and to the plane containing the upper edge of the marginal flange 23a.

One of the cups at the end of each lateral row is spaced from the margin of the tray and is integrally joined to the marginal flange by a ledge 21a or 22a having at least one wide, rounded notch therein forming continuations of radially outwardly projecting portions of the peripheral cup walls 13a. Such projecting portions form the vertical channels 40a which extend from the ledge to the bottom of the cup to facilitate radial expansion of the cup. Each ledge 21a has two channels 40a and a wider channel 41a which is located between the posts or projections 18a. The corner ledge 22a has one channel 40a adjacent the post 19a and a wider channel 42a between such posts and the end of the tray. The construction of the tray A' in the vicinity of the ledges 21a and 22a is thus substantially the same as the construction of the tray A in the vicinity of the ledges 21 and 22, the principal difference being that the width of the ledges 21a and 22a is greater than the width of the ledges 21 and 22.

At the ends of the tray A' small ledges 20a are provided between adjacent cups. Such ledges would have the same height as the ledges 21a and 22a.

The marginal flange 23a has flat side and end portions of uniform width and beveled corner portions 24a to facilitate circulation of air at the corners of the boxes in which the trays are placed.

The posts 16a and 17a are tapered like the posts 16 and 17 and decrease in size in an upward direction. The posts have walls 49 which are provided with corrugations 15a extending from the bottom wall 14a more than half the height of the post to permit expansion of the lower portion of the cup. A partition 50 having diverging walls 51 is provided between each pair of adjacent posts to separate the fruit in adjacent cups of the tray. Each partition is preferably provided with a flat double-wall fin 52 similar to the fins 25, 33 and 39 described above and having a crescent or moon-shape as best shown in FIGURE 10. Such fin separates the fruit in adjacent cups and reinforces the tray without reducing the amount of fruit which can be loaded into the tray.

The depth of each of the cups of the trays A and A' is the vertical distance from the bottom wall 14a to the top of the adjacent posts 16, 16a, 17 or 17a, and is equal to the height of said posts.

Each post 16a or 17a projects vertically a substantial distance above the top central point 54 of each partition 50. Such distance is less than half the height of the post and is usually 0.3 to 0.4 times the height of the post.

The individual cups of the tray A' are similar to the cups of the tray A in that the partitions gradually decrease in width in a direction toward the bottom wall as shown in FIGURE 10 and the corrugations are located on the posts. The wall portions of the posts extend closer to the center of each cup than the wall portions of the partitions so as to engage the piece of fruit placed in the cup. The peripheral wall 13a of each cup thus projects radially outwardly in the areas above the six radially outwardly projecting portions 53 of its bottom wall 14a will be apparent from FIGURE 12. This construction facilitates expansion of each cup and also provides the fruit with maximum protection. Each cup is tapered throughout its periphery so that a piece of fruit will engage the peripheral wall of the cup before it applies substantial force to the bottom wall of the cup. The six corrugated areas of the posts 16a and 17a will engage the piece of fruit to center it in the cup and to protect it against bruising and will yield to accommodate different sizes of fruit even though the fins 52 are substantially inextensible. The tray A functions in a similar manner. The tray A or A' also has excellent resistance to crushing by vertical forces due to the shape of the posts and partitions.

It will be understood that the above description is by way of illustration rather than limitation and that, in accordance with the provisions of the patent statutes, variations and modifications of the specific devices disclosed herein may be made without departing from the spirit of the present invention.

Having described my invention, I claim:

1. A one-piece molded multiple-compartment tray formed from a thin flexible inextensible sheet of thermoplastic vinyle resin and having parallel longitudinal and transverse rows of drawn article-receiving cup-shaped portions of generally circular shape, said tray having a generally rectangular perimeter and an endless marginal flange, each cup being in alignment with a series of other cups in one of the longitudinal rows and in alignment with a series of cups in one of the transverse rows, each inner cup which is spaced inwardly from the last-cup of one of said rows and inwardly from the margin of said tray being surrounded by size other cups and having six upwardly projecting hollow posts at its periphery, the portions of the tray between said posts providing narrow partitions, each extending between adjacent posts and having diverging walls forming part of adjacent cups, the vertical walls of each inner cup being formed by the walls of said posts and partitions, the end cups at the ends of some rows being spaced inwardly from the end cups at the ends of adjacent rows, said tray being characterized by a ledge extending between said marginal flange and an end cup which is spaced from said marginal flange, said ledge being located between a pair of end cups which are adjacent to said last-named cup and adjacent to said marginal flange, said ledge having three wide rounded notches forming continuations of radially outwardly projecting portions of the peripheral walls of said pair of cups which form smooth vertical channels of rounded cross section below said notches, said channels extending along the major portion of the height of the associated end cups to facilitate radial expansion of such cups, each channel having a vertical length about 2 to 5 times its width, each of the two posts adjacent said channels having a series of narrow vertical pleats therein, one of said three channels being located between said last-named two posts at the inner face of said ledge and the other two channels being located at the opposite sides of said ledge.

2. A multiple-compartment vacuum-molded fruit packing tray formed from a thin thermoplastic sheet material, said tray being of one-piece and having a rectangular bottom and provided along its peripheral edges with a vertically disposed flat reinforcing flange adapted to lie flush against the juxtaposed interior vertical surfaces of the box in which they are packed, with the upper rim edges of said flange terminating in a cut edge lying in the plane of the flange and strengthening said tray and its contents, the bottom of said tray being provided with rows of downwardly extending pockets having thin lower side and bottom walls readily conformable with the surface of fruit bearing thereagainst, each pocket being sized to seat snugly the major portion of individual specimens of fruit, the pockets along the edges of the tray having portions of their outer walls merging vertically with said vertically-disposed peripheral flange of said tray whereby the walls of the packing box are adapted to provide substantially direct lateral support for fruit when present in the outer ones of said pockets and whereby the pocket wall and the adjacent overlying portions of said flange prevent the fruit from contacting the interior surface of the packing box.

3. A multiple-compartment vacuum-molded fruit packing tray formed from a thin thermoplastic sheet material, said tray being of one piece and having a rectangular bottom portion and provided along its peripheral edges with a continuous vertically disposed flat reinforcing flange extending throughout the periphery of said tray, said flange having an upper cut edge lying in a horizontal plane and strengthening said tray, said bottom portion of said tray being provided with rows of downwardly extending pockets having thin lower side and bottom walls adapted to conform with fruit bearing thereagainst, each pocket being adapted to seat snugly the major portion of individual specimens of fruit, the pockets along the edges of the tray having portions of their outer walls merging vertically with said vertically-disposed peripheral flange of said tray.

4. A one-piece vacuum-molded multiple-compartment tray formed from a thin flexible inextensible sheet of thermoplastic vinyl resin and having parallel longitudinal and transverse rows of drawn article-receiving cup-shaped portions, said tray having a generally rectangular perimeter and having an endless narrow upwardly projecting vertical marginal flange extending throughout its periphery, each cup being in alignment with a series of other cups in one of the longitudinal rows and in alignment with a series of cups in one of the transverse rows, each inner cup which is spaced inwardly from the last cup of one of said rows and inwardly from the margin of say tray being surrounded by six other cups and having six upwardly projecting hollow posts at its periphery which terminate substantially in a plane below the level of said marginal flange, the portions of the tray between said posts providing narrow partitions, each extending between adjacent posts, each of said partitions terminating a substantial distance below the level of the tops of said posts and having diverging walls forming part of adjacent cups, each of said cups being tapered and increasing in size in a direction away from its bottom, the vertical walls of each inner cup being formed by the walls of said posts and said partitions and having vertical pleats to facilitate expansion of the cup, the end cups at the ends of some rows being spaced inwardly from the end cups at the ends of adjacent rows, a ledge extending between said marginal flange and an end cup which is spaced from said marginal flange, said ledge being located between a pair of end cups which are adjacent to said last-named end cup and adjacent to said marginal flange, said ledge having wide rounded notches forming continuations of radially outwardly projecting portions of the peripheral walls of said pair of cups which form vertical channels of rounded cross section below said notches, said channels extending along the major portion of the height of the associated end cup to facilitate radial expansion of such cup.

5. A one-piece molded multiple-compartment tray formed from a thin flexible inextensible sheet of thermoplastic vinyl resin and having parallel longitudinal and transverse rows of drawn article-receiving cup-shaped portions of generally circular shape, said tray having a generally rectangular perimeter and having a narrow endless upwardly projecting vertical marginal flange extending throughout its periphery, each cup being in alignment with a series of other cups in one of the longitudinal rows and in alignment with a series of cups in one of the transverse rows, each inner cup which is spaced inwardly from the last-cup of one of said rows and inwardly from the margin of said tray being surrounded by six other cups and having six upwardly projecting hollow posts at its periphery which terminate substantially in a plane below the level of said marginal flange, the portions of the tray between said posts providing narrow partitions, each extending between adjacent posts, each of said partitions terminating below the level of the tops of said posts and having diverging walls forming part of adjacent cups, each of said cups being tapered and increasing in size in a direction away from its bottom, the vertical walls of each inner cup being formed by the walls of said posts and said partitions, the ends cups at the ends of some rows being spaced inwardly from the end cups at the ends of adjacent rows, a ledge extending between said marginal flange and an end cup which is spaced from said marginal flange, said ledge being located between a pair of end cups which are adjacent to said last-named end cup and adjacent to said marginal flange, said ledge having three wide rounded notches forming continuations of radially outwardly projecting portions of the peripheral walls of said pair of cups which form vertical channels of rounded cross section below said notches, said channels extending along the major portion of the height of the associated end cup to facilitate radial expansion of such cup, the central portions of the partitions which separate the cups of the longitudinal rows having a height less than half that of the partitions which separate the cups of the transverse rows, each channel having a vertical length about 2 to 5 times its width and being separated from the other channels by one of the posts.

6. A tray as defined in claim 5 wherein the cups are aligned in diagonal rows and each inner cup has two partitions with a medium height greater than half the height of the container and two partitions of materially greater height.

References Cited in the file of this patent

FOREIGN PATENTS

| | | |
|---|---|---|
| 94,278 | Netherlands | May 16, 1960 |
| 815,204 | Great Britain | June 17, 1959 |
| 849,180 | Great Britain | Sept. 21, 1960 |

UNITED STATES PATENT OFFICE
CERTIFICATE OF CORRECTION

Patent No. 3,143,237                          August 4, 1964

Hugh R. Weiss

It is hereby certified that error appears in the above numbered patent requiring correction and that the said Letters Patent should read as corrected below.

Column 2, line 63, for "stabilibers" read -- stabilizers --; column 6, line 7, for "laterial" read -- lateral --; column 7, line 21, for "size" read -- six --; line 30, for "betwen" read --- between --; column 8, line 23, for "say" read -- said --.

Signed and sealed this 1st day of December 1964.

(SEAL)
Attest:

ERNEST W. SWIDER                                      EDWARD J. BRENNER
Attesting Officer                                          Commissioner of Patents